(12) United States Patent
Cerce

(10) Patent No.: US 8,931,122 B1
(45) Date of Patent: Jan. 13, 2015

(54) GREY WATER TOILET

(76) Inventor: Donald Cerce, Shirley, NY (US)

(*) Notice: Subject to any disclaimer, the term of this patent is extended or adjusted under 35 U.S.C. 154(b) by 690 days.

(21) Appl. No.: 13/280,415

(22) Filed: Oct. 25, 2011

(51) Int. Cl.
*A47K 4/00* (2006.01)

(52) U.S. Cl.
USPC .......................................................... 4/665

(58) Field of Classification Search
CPC ...................................................... E03B 1/04
USPC ...................................................... 4/664–665
See application file for complete search history.

(56) References Cited

U.S. PATENT DOCUMENTS

| | | | | |
|---|---|---|---|---|
| 2,443,905 A * | 6/1948 | Freund et al. | ...................... | 5/604 |
| 4,197,597 A * | 4/1980 | Toms | ................................. | 4/300 |
| 4,332,040 A * | 6/1982 | Palmer | ............................. | 4/300 |
| 4,454,613 A * | 6/1984 | Palmer | ............................. | 4/300 |
| 5,035,011 A * | 7/1991 | Rozenblatt et al. | ................ | 4/665 |
| 5,232,010 A * | 8/1993 | Rozenblatt et al. | ........... | 137/347 |
| 5,398,465 A * | 3/1995 | Tagg | ................................ | 52/79.1 |
| 5,465,438 A * | 11/1995 | Allman et al. | .................... | 4/626 |
| 5,524,666 A * | 6/1996 | Linn | ................................ | 137/337 |
| 5,742,956 A * | 4/1998 | Tarver | .............................. | 4/663 |
| 5,845,346 A * | 12/1998 | Johnson, Jr. | ....................... | 4/665 |
| 5,873,136 A * | 2/1999 | Geeham | ............................ | 4/434 |
| 5,930,845 A * | 8/1999 | Geeham | ........................ | 4/252.4 |
| 5,946,747 A * | 9/1999 | Geeham | ............................ | 4/684 |
| 5,950,250 A * | 9/1999 | Geeham | ........................ | 4/252.6 |
| 6,032,687 A * | 3/2000 | Linn | .............................. | 137/337 |
| 6,109,189 A * | 8/2000 | Tarver | .............................. | 108/48 |
| 6,328,882 B1 * | 12/2001 | Rosenblatt | .................... | 210/104 |
| 6,355,160 B1 * | 3/2002 | Wiseman et al. | ............... | 210/90 |
| 6,604,471 B1 * | 8/2003 | Tarver, Jr. | ....................... | 108/40 |
| 6,687,339 B2 * | 2/2004 | Martin | ....................... | 379/88.14 |
| 6,997,200 B2 * | 2/2006 | King | ................................ | 137/1 |
| 7,730,561 B2 * | 6/2010 | Kostelyk | ............................ | 4/625 |
| 2001/0033639 A1 * | 10/2001 | Martin | ....................... | 379/88.14 |
| 2005/0016910 A1 * | 1/2005 | Plante | ............................ | 210/194 |
| 2006/0000015 A1 * | 1/2006 | Duncan | ............................ | 4/688 |
| 2007/0174959 A1 | 8/2007 | Sanders | | |
| 2007/0199146 A1 * | 8/2007 | Kostelyk | ............................ | 4/625 |

FOREIGN PATENT DOCUMENTS

JP 4197597 B2 * 12/2008

\* cited by examiner

*Primary Examiner* — Lori Baker

(74) *Attorney, Agent, or Firm* — Kyle A. Fletcher, Esq.

(57) ABSTRACT

The grey water toilet uses only grey water generated from an adjacent sink in order to operate said toilet in an effort to lessen fresh water usage. The toilet includes a toilet tank that includes a baffle separating said toilet tank into a first portion and a second portion. The first portion is in direct fluid communication with the drain line of an adjacent sink, and which is responsible for flushing the toilet upon use of either a flush handle or pop-rod located on the adjacent sink. The faucet of the adjacent sink is supplied water from two sources, a hot water line and a cold water line that are both located under said sink, and a toilet water line that extends from the fill valve inside of the toilet.

18 Claims, 3 Drawing Sheets

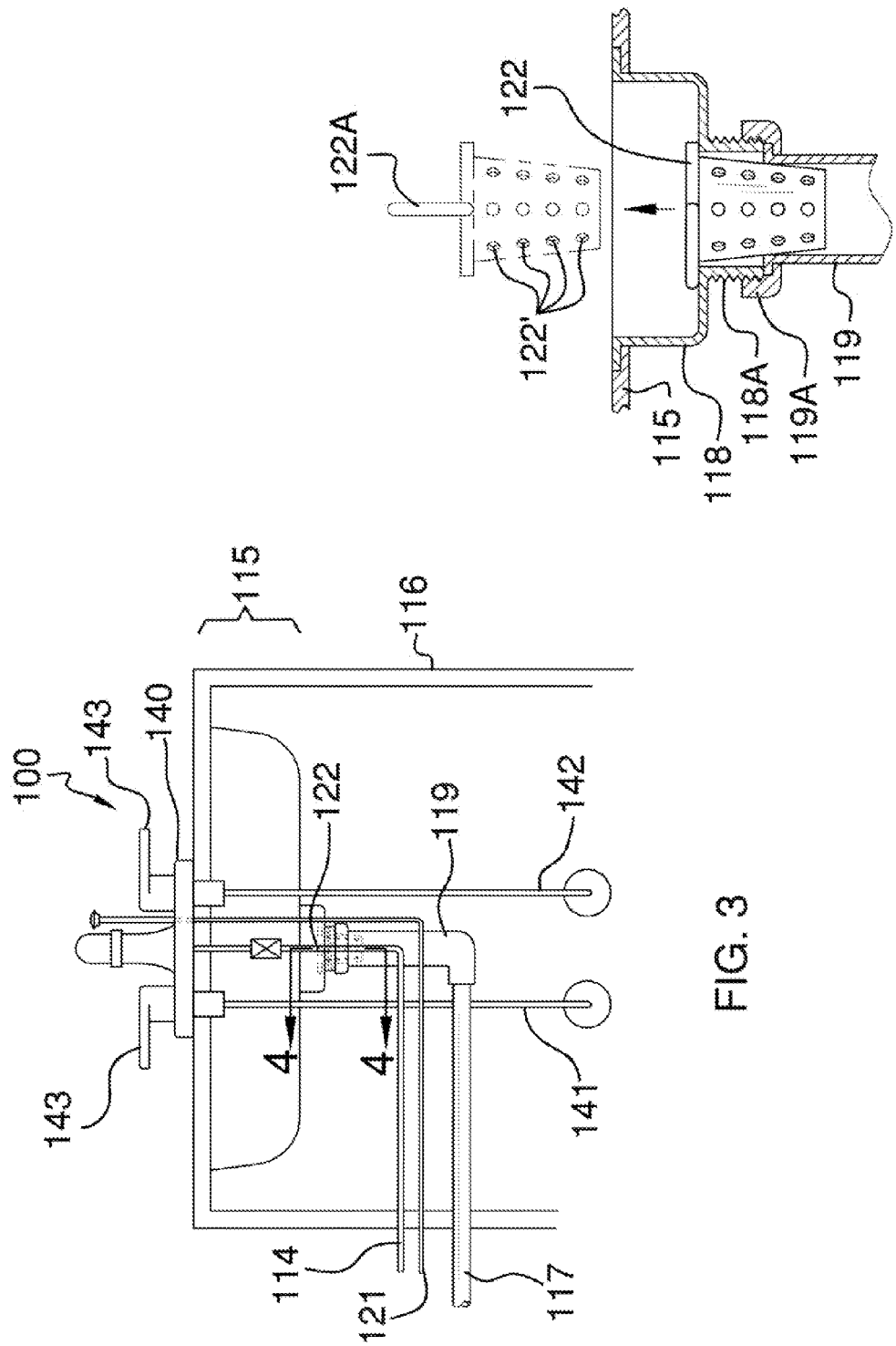

GREY WATER TOILET

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable.

BACKGROUND OF THE INVENTION

A. Field of the Invention

The present invention relates to the field of toilets, more specifically, a grey water toilet.

Demands for water conversation are ever increasing. The need to efficiently use water, and prevent unwanted waste of fresh water is a continual problem in many highly populated areas. One place with which water waste should be directed is in a bathroom.

Over the years, countless devices have arisen to recycle gray water in a bathroom environment. However, most of these devices are directed to other water applications or do not create a high-efficiency use of grey water.

B. Discussion of the Prior Art

As a preliminary note, it should be stated that there is an ample amount of prior art that deals with grey water-type toilets. However, no prior art discloses a grey water toilet that receives all water from a sink into a first portion of the toilet tank; wherein the toilet tank is divided into the first portion and a second portion via a baffle; wherein the grey water collected in said toilet tank is used to flush said toilet; wherein the toilet may be flushed via a traditional toilet flush handle or via a pop-up rod located on said sink; wherein the sink includes a removable strainer located about the sink drain and which further strains out objects from flowing down the waste line of said sink and into the toilet tank; wherein the waste line of said sink only flows directly into the first portion of the toilet tank; wherein overflow of grey water into said first portion shall flow into an overflow tube located inside of the first portion, and said overflow of grey water shall subsequently exit down the drain line from said toilet.

The Rosenblatt patent (U.S. Pat. No. 6,328,882) discloses a system for recycling waste water from showers, bath tubs, and lavatories to provide flush water for toilets and urinals. However, the system does not include a vanity with sink in fluid communication with a toilet that will use gray water from said sink to aid in operation of said toilet, and wherein said toilet can be operated by a flush handle located on said toilet or via a pop-up rod located on said sink.

The Johnson, Jr. patent (U.S. Pat. No. 5,845,346) discloses a water recycling system that utilizes gray water for flushing a toilet comprising a valve having a first orientation for allowing the flow of water only from the water supply to the toilet and a second orientation fox allowing the flow of water only from the holding tank to the toilet. However, the system does not include a sink and vanity that are solely in fluid communication with the toilet and which can operate said toilet by a regular toilet flush handle or by a pop-up rod located on said sink; and wherein gray water is used in conjunction with clean drinking water to run said toilet.

The Wiseman et al. patent (U.S. Pat. No. 6,355,160), discloses a gray-water recycling system for use in toilets and lawn care. However, the system does not enable flushing of said toilet to be performed upon use of a pop-up rod located on a sink in fluid communication with said toilet.

The Sanders et al. Patent Application Publication (U.S. Pub. No. 2007/0174959) discloses a water recycling device that utilizes gray water from a gray water source, such as a bathroom sink, to flush a toilet. Again, the sink is incapable of flushing said toilet.

The Toms patent (U.S. Pat. No. 4,197,597) discloses a water economizing system for new or existing buildings where the waste lines of lavatory sinks, showers, and clothes washing machines are connected to a storage reservoir that filters and treats the water and thereafter, it is used for the operation of toilets. Again, the system does not teach a toilet that uses gray water from a sink in fluid communication therewith, and which can flush said toilet by a pop-up rod located on said sink that can work independent of a normal toilet flush handle.

The King patent (U.S. Pat. No. 6,997,200) discloses a water conservation system comprising a recirculating/recycling valve for directing water lost down the drain to a recycling toilet tank system. Again, the conservation system does not teach a toilet that uses gray water from a sink, wherein said sink is in fluid communication therewith, and wherein said sink can flush said toilet via a pop-up rod located on said sink.

The Plante Patent Application Publication (U.S. Pub. No 2005/0016910) discloses a waste water filtering and recycling system that collects waste water to be used for flushing a toilet. Again, the system is not directed to use with a toilet that is in fluid communication with a sink, which diverts, gray water into the tank of said toilet, and wherein said sink can flush said toilet via a pop-up rod located on said sink.

While the above-described devices fulfill their respective and particular objects and requirements, they do not describe a grey water toilet that receives all water from a sink into a first portion of the toilet tank; wherein the toilet tank is divided into the first portion and a second portion via a baffle; wherein the grey water collected in said toilet tank is used to flush said toilet; wherein the toilet may be flushed via a traditional toilet flush handle or via a pop-up rod located on said sink; wherein the sink includes a removable strainer located about the sink drain and which further strains out objects from flowing down the waste line of said sink and into the toilet tank; wherein the waste line of said sink only flows directly into the first portion of the toilet tank; wherein overflow of grey water into said first portion shall flow into an overflow tube located inside of the first portion, and said overflow of grey water shall subsequently exit down the drain line from said toilet. In this regard, the grey water toilet departs from the conventional concepts and designs of the prior art.

SUMMARY OF THE INVENTION

The grey water toilet uses only grey water generated from an adjacent sink in order to operate said toilet in an effort to lessen fresh water usage. The toilet includes a toilet tank that includes a baffle separating said toilet tank into a first portion and a second portion. The first portion is in direct fluid communication with the drain line of an adjacent sink, and which is responsible for flushing the toilet upon use of either a flush handle or pop-rod located on the adjacent sink. The faucet of the adjacent sink is supplied water from two sources, a hot water line and a cold water line that are both located under said sink, and a toilet water line that extends from the fill valve inside of the toilet. Upon flushing the toilet, the faucet at said sink begins running water, which drains into the first portion of the toilet tank via a grey water drain line.

An object of the invention is to provide a toilet that can be flushed via a flush handle located on a toilet tank or via a pop-up rod located on an adjacent sink, which drains grey water generated therefrom into the toilet tank.

A further object of the invention is to provide a toilet that includes a baffled toilet tank that includes a first portion and a second portion; wherein the first portion is supplied grey water from the grey water drain line in communication with the adjacent sink.

A further object of the invention is to provide a pop-up rod that traverses from said sink to a flush handle lever such that the sink may flush said toilet.

An even further object of the invention is to direct the toilet water supply line for the toilet directly to the faucet such that all water used from the toilet water supply line is run through the faucet and into the adjacent sink for possible use by an end user in turning said water into grey water, which is then transferred back into the toilet tank for use in flushing of said toilet.

An even further object of the invention is to provide a check valve between the faucet and the toilet water supply line.

A further object of the invention is to enable the faucet of said sink to derive water either from the toilet water supply line or from a hot and cold water supply line located under the sink.

A further object of the invention is to include a removable strainer located on the sink, which filters out debris before said grey water travels down to said toilet or down the sink trap.

These together with additional objects, features and advantages of the grey water toilet will be readily apparent to those of ordinary skill in the art upon reading the following detailed description of presently preferred, but nonetheless illustrative, embodiments of the grey water toilet when taken in conjunction with the accompanying drawings.

In this respect, before explaining the current embodiments of the grey water toilet in detail, it is to be understood that the grey water toilet is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the grey water toilet.

It is therefore important that the claims be regarded as including such equivalent construction insofar as they do not depart from the spirit and scope of the grey water toilet. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 3 illustrates a detail view of the sink and vanity and depicting the hot water supply line, the cold water supply line, and the toilet water supply line in fluid communication with the faucet as well as the pop-up rod and grey-water line extending to the toilet (not depicted); and FIG. 4 illustrates a cross-sectional view of the removable strainer along line 4-4 in FIG. 3, and which includes an arrow indicating lifting of said removable strainer from within said sink.

DETAILED DESCRIPTION OF THE EMBODIMENT

The following detailed description is merely exemplary in nature and is not intended to limit the described embodiments the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations.

All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
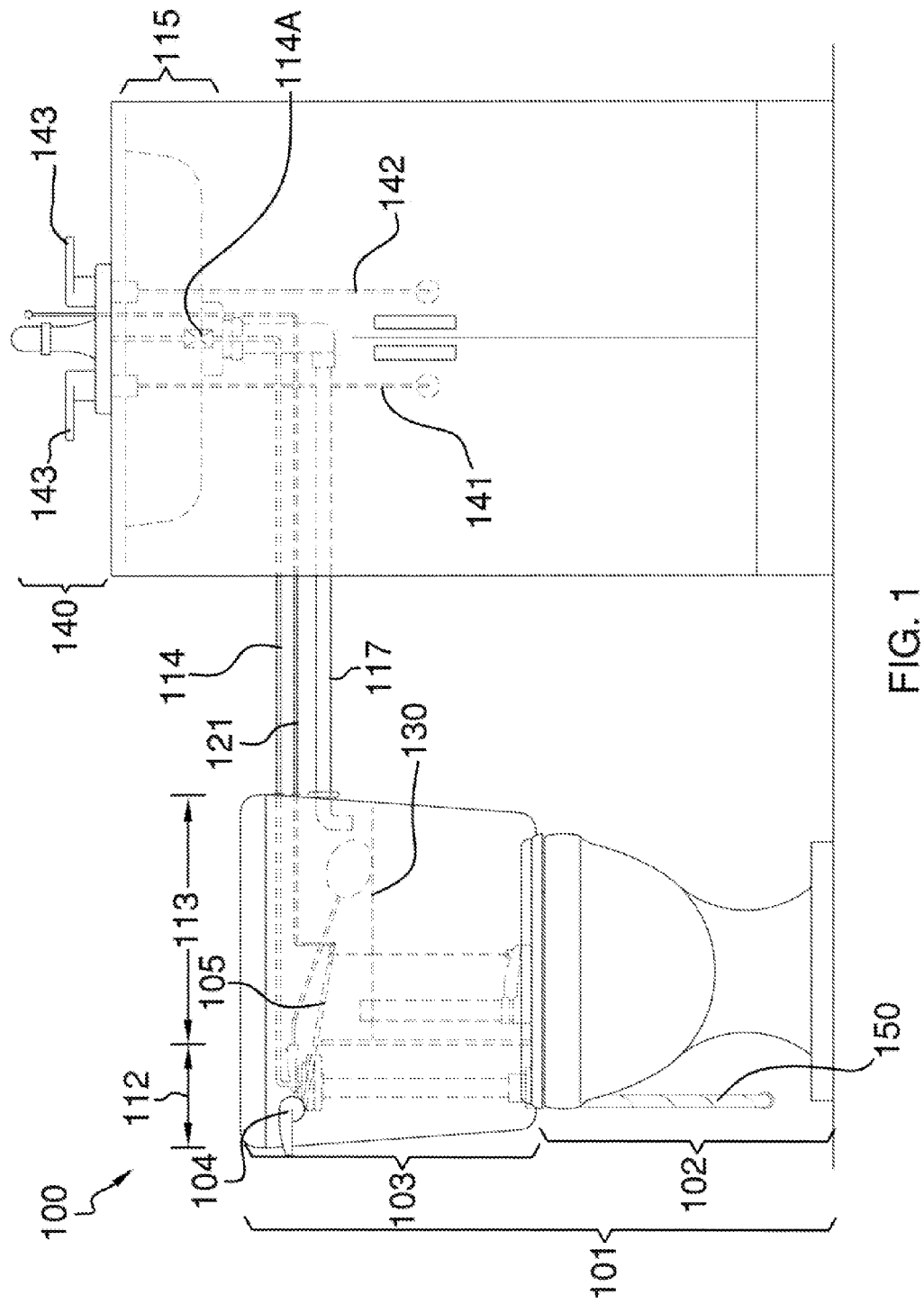
FIG. 1 illustrates a front view of the grey water toilet and sink and vanity located adjacent thereto, and which depicts the components in broken lines within said toilet tank and under said sink.
Figure 2:
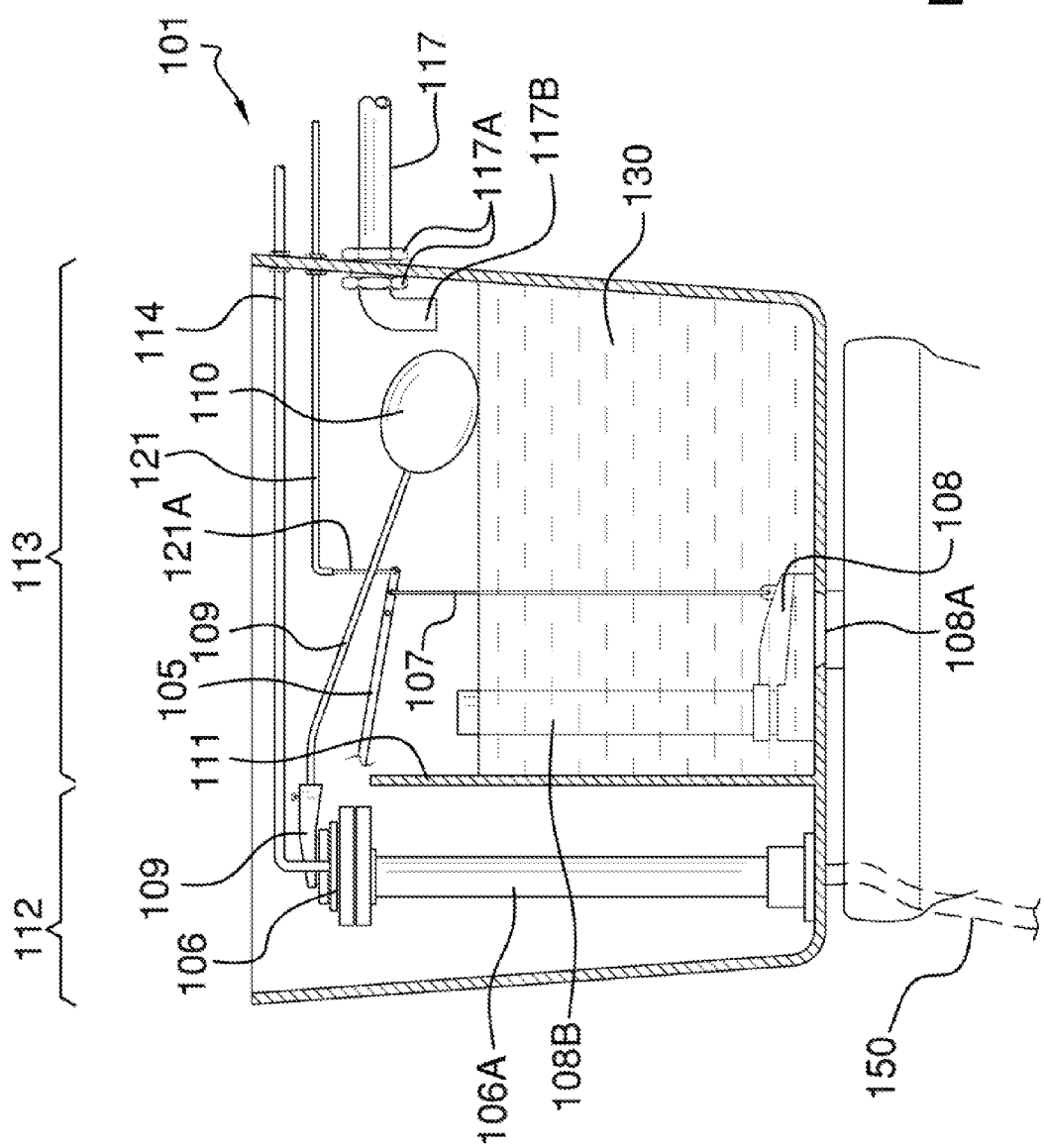
FIG. 2 illustrates a detail view of the toilet tank and all related components contained within and which enables operation of the toilet as well as partial operation of the faucet.

Detailed reference will now be made to the preferred embodiment of the present invention, examples of which are illustrated in FIGS. 1-4. A grey water toilet 100 (hereinafter invention) includes a toilet 101 further defined by a toilet bowl 102 in fluid communication with a toilet tank 103. The toilet tank 103 includes a toilet flush handle 104 located thereon, and which is in mechanical connection with a flush handle lever 105.

The flush handle lever 105 is attached to a linkage 107 that will open a rubber gasket 108 seated over an outlet 108A located at the bottom of the toilet tank 103 and in fluid communication with an overflow tube 108B. A fill valve 106 includes an arm 109 and float 110 that descends downwardly into the toilet tank 103 and opens said fill valve 106 when the float 110 drops below a predefined level within the toilet tank 103.

Located within the toilet tank 103 is a baffle 111, which defines a second portion 112 and a first portion 113. It shall be noted that the first portion 113 collects grey water from a sink 115 adjacent to the toilet 101. The second portion is dry, and does not receive any kind of water within. The baffle 111 splits the toilet tank 103 into the two portions.

It shall be noted that the float 110 descends into the first portion 113, and operates the fill valve 106 once the level of grey water 130 located within the first portion 112 drops below a predefined level. Upon happening of an event where the grey water 130 drops below a predefined level within the first portion 113, the fill valve 106 shall open, and direct freshwater into a faucet 140 mounted onto the sink 115.

The fill valve 106 is in fluid communication with a toilet water supply line 150. It shall be noted that the toilet water supply line may be tempered through a mixing valve, which is not depicted in the drawings. The toilet water supply line 150 supplies freshwater into the invention 100. Once, the fill valve 106 opens, freshwater is transferred from the toilet water supply line 150 to a freshwater line 114, which extends from the fill valve 106 to the faucet 140. It shall be noted that a check valve 114A is included in-line with the freshwater line 114. Moreover, the check valve 114A is positioned between the fill valve 106 and the faucet 140.

Upon opening of the fill valve 106, freshwater is run through the faucet 140 and into the sink 115 before becoming grey water 130. In referring to FIG. 2, it should be noted that the fill valve 106 is supported atop a valve housing 106A that extends down to a bottom surface of the toilet tank 103, and which is well known in the art.

The sink 115 may include a vanity 116 or simply be mounted onto a wall or include a pedestal or be mounted atop of the toilet tank 103 in order to save space within a bathroom. The sink 115 and the faucet 140 are collectively in fluid communication with the toilet 101 via the freshwater line 114 and also via a grey water drain line 117.

The grey water drain line 117 is secured to the toilet tank 103 via fastening means 117A, and may include a flow director 117B, which directs grey water 130 into the first portion 113.

The faucet 140 is supplied water from two types of sources: (1) the freshwater line 114 as discussed above, and (2) a hot water supply line 141, and a cold water supply line 142. That being said, the faucet 140 begins running water upon rotating faucet knobs 143 or upon freshwater running up from the freshwater line 114.

The sink 115 includes a drain 118 that is located at the bottom of the sink 115 and which is connected to an elbow 119, which extends down and connects to the grey water drain line 117. All water passing down from the sink 115 shall enter, into the first portion 113 of the toilet 101, and subsequently used to flush the toilet 101. It shall be noted that if the faucet 140 is running beyond what the first portion 113 of the toilet 101 can accommodate, excess grey water 130 shall be directed into the overflow tube 108B in order to prevent overflow of water in and around the toilet 101 and the sink 115.

The sink 115 includes a pop-up rod 121 that traverses from the faucet 140 to the flush handle lever 105, and which can remotely flush the toilet 101 without use of the toilet flush handle 104. The pop-up rod 121 actually includes a pop-up cable 121A that performs the mechanical movement required to rotate the flush handle lever 105 in order to flush the toilet 101. It shall be noted that the inclusion of the pop-up rod 121 and the pop-up cable 121A enable the toilet 101 to flush where an end user has ($1^{st}$) used the toilet 101, ($2^{nd}$) has washed their hands via the sink 115 and the faucet 140, ($3^{rd}$) wants to enable grey water 130 to fill up the first portion 113 of the toilet tank 103, and ($4^{th}$) flush the toilet 101 via the pop-up rod 121 so as to not touch a contaminated toilet flush handle 104.

Conversely, it shall be noted that upon flushing the toilet 101 via the toilet flush handle 104, the arm 109 and the float 110 descend downwardly within the toilet tank 103, which causes the fill valve 106 to open and begin, running freshwater via the freshwater line 114 to the faucet 140 automatically, and without manipulating the push up rod 121 or the faucet knobs 143. Moreover, the faucet 140 operates automatically upon flushing the toilet 101 so an end user can wash his/her hands, and water passing down the sink 115 is diverted directly into the toilet tank 103 in order to conserve water.

A removable strainer 122 is include with the invention 100 and is seated in the drain 118 so as to enable filter of debris before traveling down the grey water drain line 117, and into the toilet tank 103. The removable strainer 122 shall feature a handle 122A that folds up to enable removal and insertion from the drain 118. The removable strainer 122 features a plurality of holes 122', which filters out waste water from the sink 115 before becoming grey water 130.

The elbow 119 shall connect to the drain 118 via a threaded collar 119A, which screws onto external threading 118A located on said drain 118. The threaded collar 119A insures a watertight connection exists between the drain 118 and the elbow 119.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A grey water toilet comprising:
   a toilet that has a toilet tank in adaptive fluid communication with a sink and a faucet;
   said sink and faucet are adjacent of said toilet;
   wherein grey water supplies said toilet from said sink;
   said grey water flushes said toilet;
   wherein freshwater supplies said faucet;
   said freshwater runs through said sink and turns into grey water that is diverted into said toilet tank;
   said grey water flushes said toilet;
   wherein said sink includes a pop-up rod to flush said toilet in addition to a toilet flush handle;
   wherein either the pop-up rod or toilet flush handle shall direct water to said faucet, which then passes down said sink and into said toilet tank;
   a baffle defines a first portion and a second portion;
   wherein a float extended via an arm and fill valve descends into said first portion; wherein said fill valve is in fluid communication between a toilet water supply line and a freshwater line; wherein said freshwater line connects with said faucet.

2. The grey water toilet as described in claim 1 wherein a check valve is in-line with the freshwater line; wherein the faucet is supplied water from the freshwater line or from a hot water supply line and a cold water supply line.

3. The grey water toilet as described in claim 1 wherein the toilet includes an overflow tube in order to prevent overflow of grey water sourced from said sink and diverted into the first portion of said toilet tank.

4. The grey water toilet as described in claim 1 wherein use of the pop-up rod or the flush handle shall flush said toilet, which will direct freshwater to said faucet, and down into said sink before becoming grey water that is diverted via a grey water drain line into said first portion of said toilet tank for use in a subsequent flush.

5. The grey water toilet as described in claim 4 wherein the faucet can direct water from either the hot water supply line or the cold water supply line via faucet knobs, which shall run water down into said sink before becoming grey water that is diverted via the grey water drain line into said first portion of said toilet tank for use in a subsequent flush.

6. The grey water toilet as described in claim 1 wherein a removable strainer fits in the drain and filters out debris prior to traveling down the grey water drain line.

7. A grey water toilet comprising:
a toilet that has a toilet tank in adaptive fluid communication with a sink and a faucet;
said sink and faucet are adjacent of said toilet;
wherein grey water supplies said toilet from said sink;
said grey water flushes said toilet;
wherein freshwater supplies said faucet;
said freshwater runs through said sink and turns into grey water that is diverted into said toilet tank;
said grey water flushes said toilet;
wherein said sink includes a pop-up rod to flush said toilet in addition to a toilet flush handle;
wherein a baffle defines a first portion and a second portion;
wherein either the pop-up rod or toilet flush handle shall direct water to said faucet, which then passes down said sink and into said toilet tank;
wherein a float extended via an arm and fill valve descends into said first portion; wherein said fill valve is in fluid communication between a toilet water supply line and a freshwater line; wherein said freshwater line connects with said faucet.

8. The grey water toilet as described in claim 7 wherein a check valve is in-line with the freshwater line; wherein the faucet is supplied water from the freshwater line or from a hot water supply line and a cold water supply line.

9. The grey water toilet as described in claim 7 wherein the toilet includes an overflow tube in order to prevent overflow of grey water sourced from said sink and diverted into the first portion of said toilet tank.

10. The grey water toilet as described in claim 7 wherein use of the pop-up rod or the flush handle shall flush said toilet, which will direct freshwater to said faucet, and down into said sink before becoming grey water that is diverted via a grey water drain line into said first portion of said toilet tank for use in a subsequent flush.

11. The grey water toilet as described in claim 10 wherein the faucet can direct water from either the hot water supply line or the cold water supply line via faucet knobs, which shall run water down into said sink before becoming grey water that is diverted via the grey water drain line into said first portion of said toilet tank for use in a subsequent flush.

12. The grey water toilet as described in claim 7 wherein a removable strainer fits in the drain and filters out debris prior to traveling down the grey water drain line.

13. A grey water toilet comprising:
a toilet that has a toilet tank in adaptive fluid communication with a sink and a faucet;
said sink and faucet are adjacent of said toilet;
wherein grey water supplies said toilet from said sink;
said grey water flushes said toilet;
wherein freshwater supplies said faucet;
said freshwater runs through said sink and turns into grey water that is diverted into said toilet tank;
said grey water flushes said toilet;
wherein said sink includes a pop-up rod to flush said toilet in addition to a toilet flush handle;
wherein either the pop-up rod or toilet flush handle shall direct water to said faucet, which then passes down said sink and into said toilet tank;
wherein a baffle defines a first portion and a second portion;
wherein a float extended via an arm and fill valve descends into said first portion; wherein said fill valve is in fluid communication between a toilet water supply line and a freshwater line; wherein said freshwater line connects with said faucet;
wherein the faucet is supplied water from the freshwater line or from a hot water supply line and a cold water supply line.

14. The grey water toilet as described in claim 13 wherein a check valve is in-line with the freshwater line.

15. The grey water toilet as described in claim 13 wherein the toilet includes an overflow tube in order to prevent overflow of grey water sourced from said sink and diverted into the first portion of said toilet tank.

16. The grey water toilet as described in claim 13 wherein use of the pop-up rod or the flush handle shall flush said toilet, which will direct freshwater to said faucet, and down into said sink before becoming grey water that is diverted via a grey water drain line into said first portion of said toilet tank for use in a subsequent flush.

17. The grey water toilet as described in claim 16 wherein the faucet can direct water from either the hot water supply line or the cold water supply line via faucet knobs, which shall run water down into said sink before becoming grey water that is diverted via the grey water drain line into said first portion of said toilet tank for use in a subsequent flush.

18. The grey water toilet as described in claim 13 wherein a removable strainer fits in the drain and filters out debris prior to traveling down the grey water drain line.

\* \* \* \* \*